United States Patent
Tatematsu et al.

(10) Patent No.: US 7,843,092 B2
(45) Date of Patent: Nov. 30, 2010

(54) CORE AND METHOD FOR PRODUCING CORE

(75) Inventors: Kazutaka Tatematsu, Nagoya (JP); Ryoji Mizutani, Nishikamo-gun (JP); Yasuhiro Endo, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 333 days.

(21) Appl. No.: 11/991,061

(22) PCT Filed: Sep. 8, 2006

(86) PCT No.: PCT/JP2006/318323
§ 371 (c)(1), (2), (4) Date: Feb. 27, 2008

(87) PCT Pub. No.: WO2007/029887
PCT Pub. Date: Mar. 15, 2007

(65) Prior Publication Data
US 2009/0121820 A1    May 14, 2009

(30) Foreign Application Priority Data
Sep. 8, 2005    (JP) ............................. 2005-260521

(51) Int. Cl.
*H02K 15/12* (2006.01)
(52) U.S. Cl. ............................. 310/44; 310/45; 29/596
(58) Field of Classification Search .............. 310/42, 310/43, 44, 45, 216.067; 29/596–598
See application file for complete search history.

(56) References Cited

U.S. PATENT DOCUMENTS 4,451,749 A * 5/1984 Kanayama et al. ............ 310/62

2003/0077448 A1   4/2003  Ueta et al.

FOREIGN PATENT DOCUMENTS

| JP | A-54-72404 | 6/1979 |
|----|------------|--------|
| JP | A 64-50730 | 2/1989 |
| JP | 5316699 | * 11/1993 |
| JP | A 05-316699 | 11/1993 |
| JP | A 06-260319 | 9/1994 |
| JP | A-6-284613 | 10/1994 |
| JP | A 06-339242 | 12/1994 |
| JP | A-8-317616 | 11/1996 |
| JP | 9149580 | * 6/1997 |

(Continued)

OTHER PUBLICATIONS

Mar. 16, 2010 Japanese Office Action in Japanese Application No. 2005-260521, with translation.

(Continued)

*Primary Examiner*—Quyen Leung
*Assistant Examiner*—Leda Pham
(74) *Attorney, Agent, or Firm*—Oliff & Berridge, PLC

(57) ABSTRACT

Disclosed is a highly heat-resistant core which has a dust core as a base body. A dust core obtained by press-molding magnetic powder particles each of which are covered with an insulating film is used as the base body. An inorganic heat-resistant insulating film is formed on at least a part of a surface of the dust core which faces a winding wire.

1 Claim, 5 Drawing Sheets

FOREIGN PATENT DOCUMENTS

| | | | |
|---|---|---|---|
| JP | A 09-149580 | | 6/1997 |
| JP | 09182386 A | * | 7/1997 |
| JP | A 09-182386 | | 7/1997 |
| JP | A 11-214224 | | 8/1999 |
| JP | A 2003-303711 | | 10/2003 |
| JP | 2004242443 | * | 8/2004 |
| JP | A 2004-242443 | | 8/2004 |
| JP | A 2004-251412 | | 9/2004 |
| JP | 2004364402 A | * | 12/2004 |
| JP | A 2004-364402 | | 12/2004 |

OTHER PUBLICATIONS

Apr. 8, 2010 Office Action in Chinese Application No. 200680032389.1, with translation.

Jul. 20, 2010 Office Action in Japanese Application No. 2005-260521, with translation.

* cited by examiner

CORE AND METHOD FOR PRODUCING CORE

TECHNICAL FIELD

The present invention relates to a core on which a winding wire is wound, and a method for producing the core.

BACKGROUND ART

FIG. 5 is a schematic sectional view of a tooth 51 of a motor core 50 described in JP 2004-242443 A. In FIG. 5, the motor core 50 is a dust core which is formed by compression molding of magnetic powder particles having an insulating film. The tooth 51 is formed to have an outer peripheral surface with a smooth curved surface. A resin is coated on the outer peripheral surface of the tooth 51 to form an insulating film layer 52, and a winding wire 53 is wound on the insulating film layer 52 around the whole circumference of the tooth 51.

With a motor core 50 having the above structure as described in JP 2004-242443 A, because the outer peripheral surface of the tooth 51 is formed to have a smooth curved surface, no one portion of the winding wire 53 is subjected to a particularly high surface pressure, and an insulating film covering the winding wire 53 does not frequently become damaged. Therefore, in a case where the very thin insulating film layer 52 is applied to the tooth 51 and the motor is used for a long time, short circuiting between the core line (copper line) of the winding wire 53 and the tooth 51 can be sufficiently prevented.

Because the outer peripheral surface of the tooth 51 is formed on the smooth curved surface, no gap is produced between the tooth 51 and the winding wire 53. Thus, the space for winding the winding wire 53 is increased, and an occupied area ratio of the winding wire can be increased by increasing the winding wire 53 or a flux amount can be increased by thickening the tooth 51. As a result, the motor output can be improved.

JP 2004-364402 A describes that a core which is provided with a coil and formed by compression molding of insulation-coated magnetic powder particles has an insulating film which is formed of insulating powder particles on a mounting surface where the coil is mounted.

JP 1-050730 A describes that an inorganic heat-resistant insulating layer of ceramic or the like is previously applied to a portion having slots in which a winding wire is incorporated or a portion where a winding wire and a stator are mutually contacted.

JP 9-149580 A discloses that the surface of an electric motor part formed of a plastic molded part is coated with a thin film of an inorganic material.

JP 2004-251412 A describes a rolling bearing having an insulating layer of a diamond like carbon layer.

DISCLOSURE OF THE INVENTION

As described above, because the core described in JP-A 2004-242443 employs a dust core having a high degree of shape freedom, the outer peripheral surface of the tooth can be formed to have a smooth curved surface, and a larger number of effects can be obtained as a result.

However, because the core described in JP 2004-242443 A employs a resin film as the insulating film layer, the current density and heat-generation density of the winding wire can not be made high because a heat-resistant temperature is low (approximately 200° C. at the highest). As such, the downsizing of the motor is impeded. More specifically, although the demand for downsizing of motors used in automobiles has recently been increasing, when the winding wire density is increased and larger amounts of current is directed to it in connection with downsizing, the amount of heat generated in the winding wire increases. In addition, because heat mass becomes small by downsizing, the motor temperature tends to increase. Therefore, in connection with the downsizing of the motor, the height of the heat-resistant temperature becomes very significant, and if the heat resistance of the insulating film layer of the core described above is low, the downsizing is hindered.

Under the circumstances described above, the present invention provides a core which has a dust core as a base body, and which is made to have high heat resistance.

The core according to the present invention is a core on which a winding wire is wound, wherein a dust core which has magnetic powder particles coated with an insulating film press-molded is used as a base body, and an inorganic heat-resistant insulating film is formed on at least a part of the surface of the dust core which faces the winding wire.

In one preferable configuration of the present invention, a winding surface of the dust core on which the winding wire is wound is formed to have a smooth curved surface.

According to another preferable configuration of the present invention, the inorganic heat-resistant insulating film is a DLC film.

The method for producing a core according to the present invention is a method for producing a core on which a winding wire is wound, comprising the steps of compacting by charging magnetic powder particles coated with an insulating film into a molding die and press-molding the magnetic powder particles in the molding die; etching to remove the surface layer of the press-molded dust core; and film forming to form an inorganic heat-resistant insulating film on at least a part of the surface of the etched dust core which faces the winding wire.

The method for producing a core according to the present invention is a method for producing a core on which a winding wire is wound, comprising the steps of compacting by charging magnetic powder particles coated with an insulating film into a molding die and press-molding the magnetic powder particles in the molding die; coating an insulating ceramic material on at least a part of the surface of the press-molded dust core which faces the winding wire; and heating to perform a heat treatment of the ceramic material-coated dust core to calcine the ceramic material and to anneal the dust core at the same time.

According to the present invention, the core has the dust core as the base body, and the core having high heat resistance can be provided.

BEST MODE FOR CARRYING OUT THE INVENTION

Embodiments of the present invention are described below with reference to the drawings. Although in the following an example of applying the core according to the present invention to the stator core of a so-called concentrated-wound permanent magnet embedded motor is described, this is only an explanatory example, and the core according to the present invention can also be applied to other types of motors.

[Overall Motor Structure]

Figure 1:
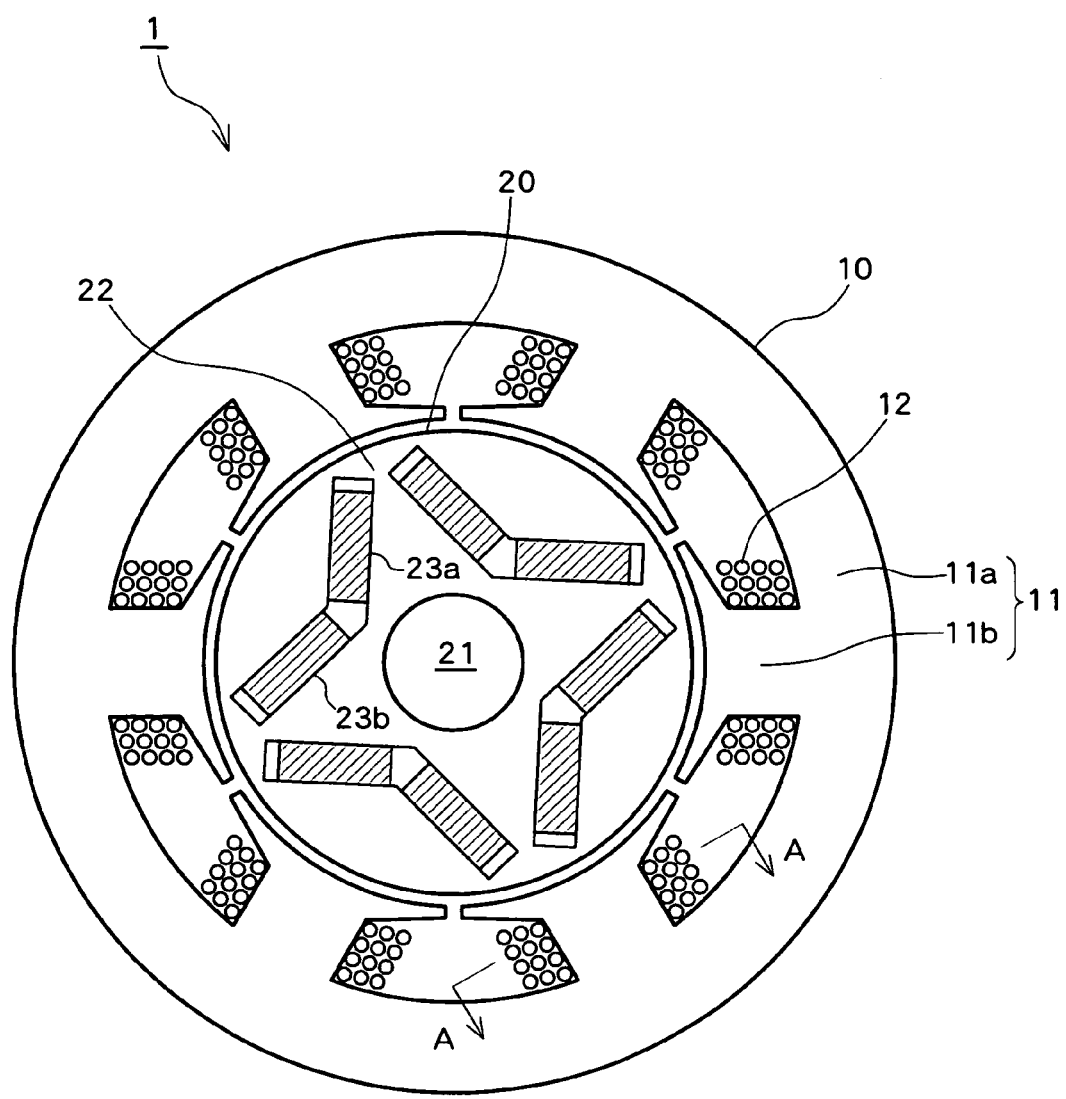
FIG. 1 is a schematic sectional view of a motor to which a core according to the present invention is applied.

FIG. 1 is a schematic sectional view of a motor 1 to which the core according to the present invention is applied. In FIG. 1, the motor 1 is configured from a combination of a concentrated-wound type stator 10 and a permanent magnet embedded type rotor 20.

The stator 10 is substantially cylindrical and mainly comprised of a stator core 11 and a winding wire 12 which is wound around it. The stator core 11 is comprised of a substantially cylindrical yoke portion 11a and plural (six in this example) tooth portions 11b which are disposed to extend toward the central axis at prescribed intervals within the yoke portion 11a. The respective phase winding wires 12 are wound around the six tooth portions 11b by concentrated winding.

The rotor 20 is substantially cylindrical and disposed coaxially with the stator 10 via an air gap in the stator 10. The rotor 20 is provided with a rotary shaft 21. The rotary shaft 21 is mounted with a cylindrical rotor core 22 which has the rotary shaft 21 as the central axis. Permanent magnets which configure plural magnetic poles are embedded in the rotor core 22. In the rotor core 22, four pairs of permanent magnets 23a, 23b, each pair being arranged to form a V shape, are embedded in a circumferential direction at equiangular intervals to configure four magnetic poles.

Flowing three-phase AC current to the winding wire 12 of the stator 10 in the structure described above generates a rotating magnetic field, and the rotor 20 is rotated about the rotary shaft 21 by magnet torque and reluctance torque.

[Stator Core Structure]

Figure 2:
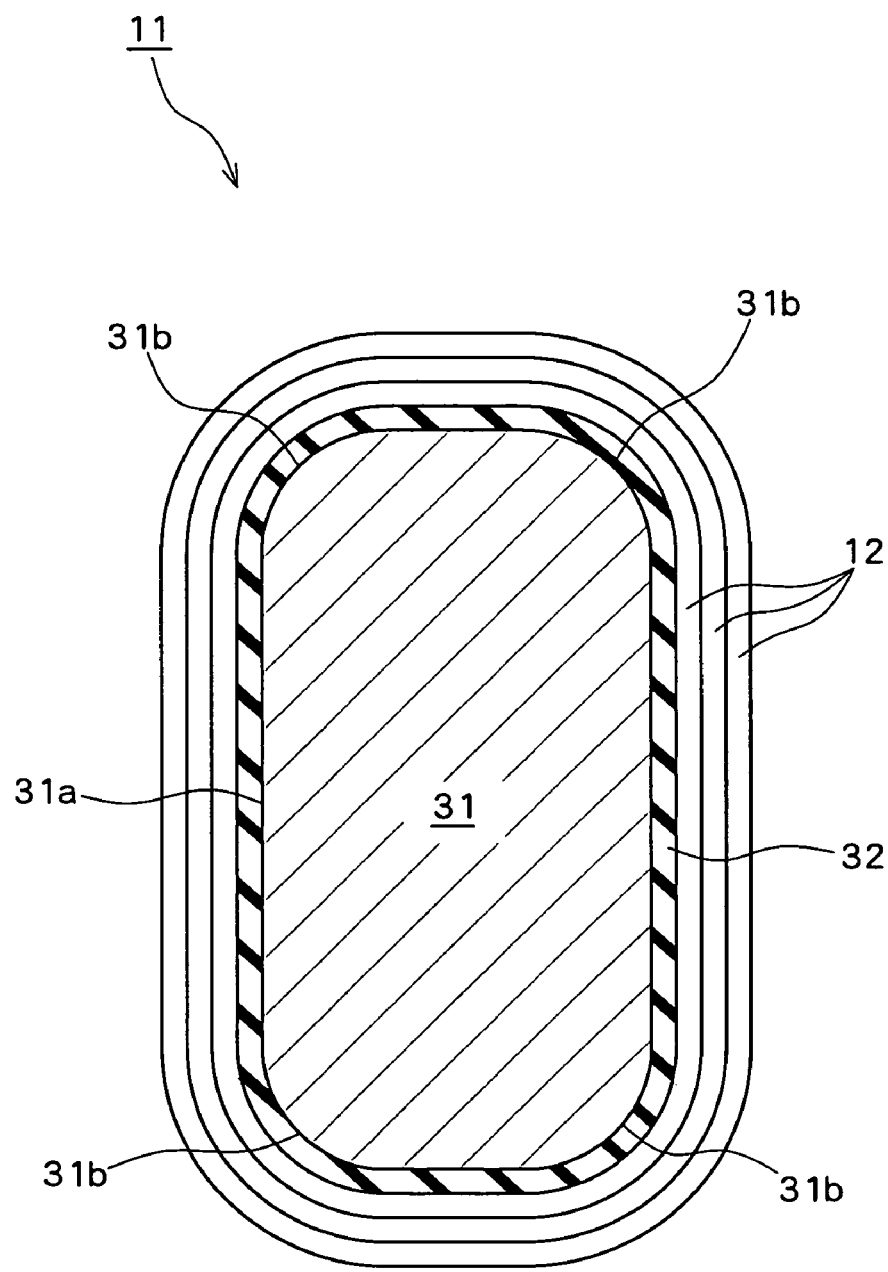
FIG. 2 is a sectional view taken along line A-A of FIG. 1.

FIG. 2 is a sectional view taken along line A-A of FIG. 1, being a sectional view of the tooth portion 11b of the stator core 11. The structure of the stator core 11 is described below with reference to FIG. 2.

In this embodiment, the stator core 11 has as a base body a dust core 31 which is formed by press-molding of magnetic powder particles coated with an insulating film. The winding surface (specifically, an outer peripheral surface 31a of a portion of the dust core 31, which corresponds to the tooth portion 11b) of the dust core 31 on which the winding wire 12 is wound is formed to have a smooth curved surface. In the example shown in FIG. 2, the dust core 31 of the tooth portion 11b has a substantially rectangular cross section, and its four corner portions 31b are chamfered to the R-shape.

An inorganic heat-resistant insulating film 32 is formed on a surface of the dust core 31 which faces the winding wire 12. As the inorganic heat-resistant insulating film 32, a DLC (Diamond Like Carbon) film or a ceramic film is preferable. Here, it is assumed that the heat-resistant insulating film 32 is formed to cover the entire slot surface which faces the winding wire 12. But, the heat-resistant insulating film 32 may be formed on a part (e.g., winding surface) of the slot surface which faces the winding wire 12.

Additionally, the winding wire 12 is wound on the outer peripheral surface 31a of the portion of the dust core 31 corresponding to the tooth portion 11b via the heat-resistant insulating film 32.

[Method for Producing a Stator (Application of Ceramic Film)]

Figure 3:
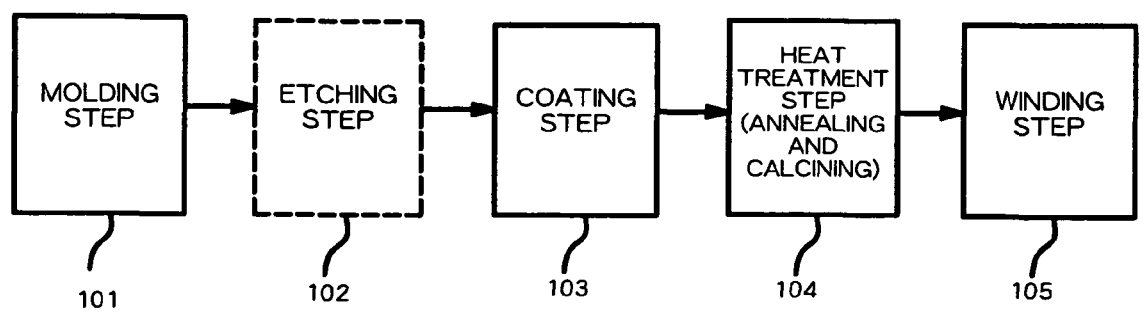
FIG. 3 is a flowchart showing a method of producing a stator, where a ceramic film is applied as a heat-resistant insulating film.

FIG. 3 is a flowchart showing a method for producing the stator 10 in which the ceramic film is applied as the heat-resistant insulating film 32. The method for producing the stator 10 in connection with the application of the ceramic film is described with reference to FIG. 3.

First, a compacting step 101 charges magnetic powder particles, which are coated with an insulating film, into a molding die and performs press-molding of the magnetic powder particles in the molding die. Here, the press-molding is performed such that the outer peripheral surface of a portion corresponding to the tooth portion of the compacted body obtained in the compacting step 101 has a smooth curved surface.

Then, an etching step 102 removes the surface layer of the press-molded dust core (compacted body) by etching. Specifically, the compacted body is immersed in an etching solution such as diluted acid (e.g., nitric acid) for several minutes to remove the surface layer by etching, and is then washed and subjected to a rust-preventing treatment. The etching is performed for the following reasons. Specifically, when the compacted body is removed from the molding die in the compacting step 101, the surface of the compacted body is rubbed with the wall surface of the molding die, and the insulating film covering the magnetic powder particles is broken. These magnetic powder particles on the surface layer of the compacted body short circuit with each other, resulting in a state wherein the insulating effect among the magnetic powder particles produced by the insulating film is lost. As a result, the magnetic characteristics of the dust core are also lost. Accordingly, the short-circuited surface layer is removed by etching. If appropriate, the etching step 102 can be omitted in consideration of the magnetic characteristics and the like required for the dust core.

A coating step 103 applies an insulating ceramic material to a surface of the etched dust core which faces the winding wire.

A heat treatment step 104 performs a heat treatment of the dust core which has been through the ceramic material coating to calcine the ceramic material and to anneal the dust core at the same time. Here, the annealing of the dust core is strain elimination annealing for removing strain produced within the dust core at the time of press-molding, which is a heat treatment generally performed to reduce a hysteresis loss of the dust core. The contents of the heat treatment step 104 are described specifically. The dust core which is through the ceramic material coating is treated by a continuous furnace and the like in order of (1) temperature rising→(2) constant temperature holding→(3) cooling. In the temperature rising step (1), the temperature is raised to a desired level at a temperature rising speed of about 20 to 30° C./min. In the constant temperature holding step (2), the temperature (e.g., about 700 to 800° C.) at which the strain elimination annealing and the ceramic coating calcining can be performed at the same time is held for a prescribed time (about several tens of minutes). In the cooling step (3), the temperature is lowered to a desired level at a cooling speed of about 20 to 30° C./min.

Then, a winding step 105 winds a winding wire on the tooth portions of the stator core produced through the steps 101 to 104.

[Method for Producing a Stator (Application of DLC Film)]

Figure 4:
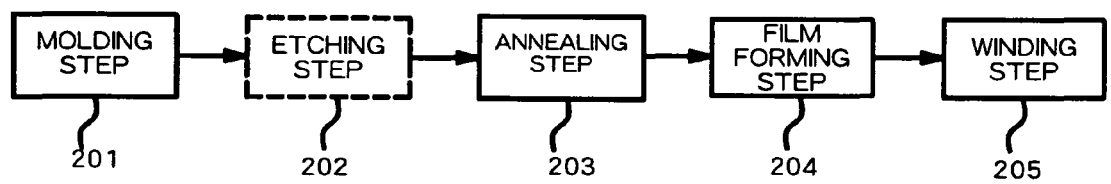
FIG. 4 is a flowchart showing a method of producing a stator, where a DLC film is applied as a heat-resistant insulating film.
Figure 5:
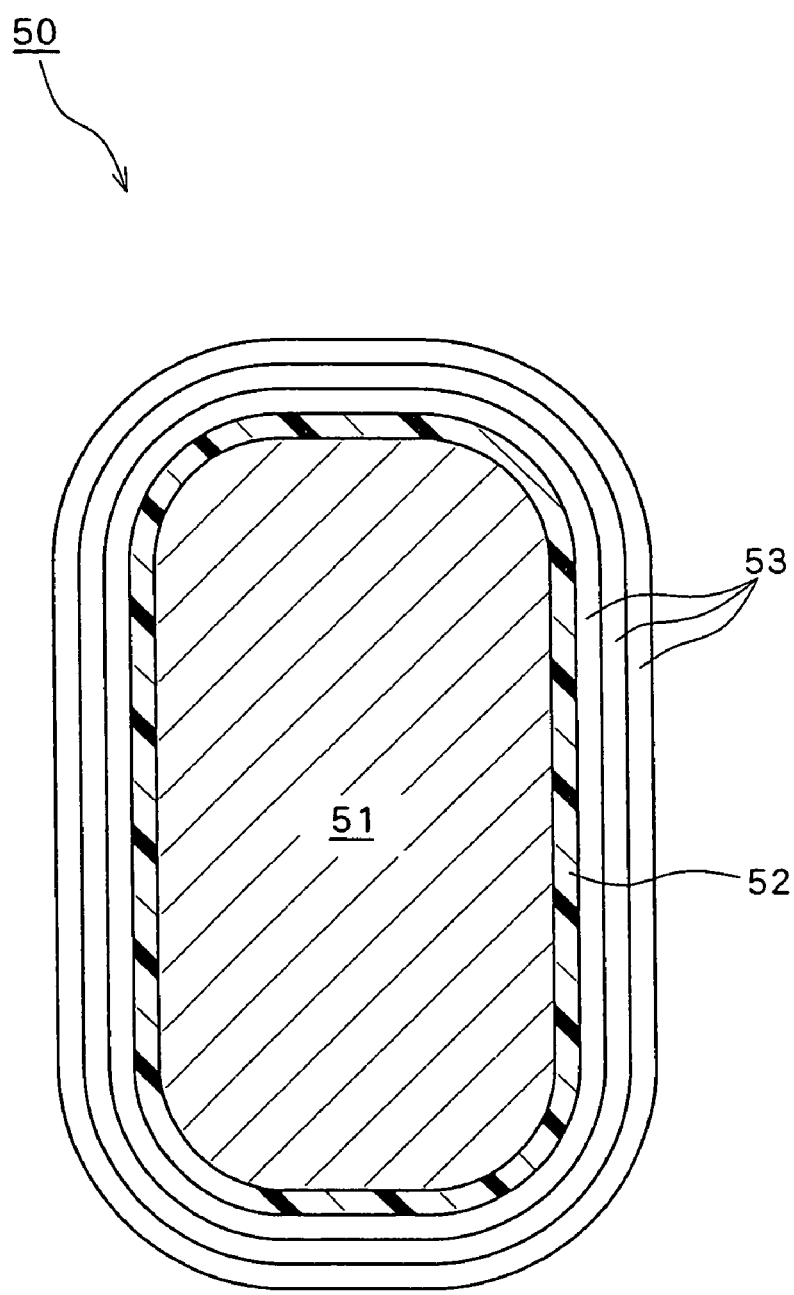
FIG. 5 is a schematic sectional view of a tooth of a motor core described in JP 2004-242443 A.

FIG. 4 is a flowchart showing a method for producing the stator 10 in connection with the application of the DLC film as the heat-resistant insulating film 32. The method for producing the stator 10 in connection with the application of the DLC film is described with reference to FIG. 4.

First, similar to the above-described compacting step 101, a compacting step 201 charges magnetic powder particles coated with an insulating film into a molding die and performs press-molding of the magnetic powder particles in the molding die.

Then, an etching step 202 removes the surface layer of the press-molded dust core (compacted body) by etching in the same manner as the above-described etching step 102. If appropriate, the etching step 202 can be omitted in consideration of the magnetic characteristics and the like required for the dust core.

An annealing step 203 performs strain elimination annealing of the etched dust core. The contents of the annealing step 203 are described specifically. The etched dust core is treated by a continuous furnace and the like in order of (1) temperature rising→(2) constant temperature holding→(3) cooling. In the temperature rising step (1), the temperature is raised to a desired level at a temperature rising speed of about 20 to 30° C./min. In the constant temperature holding step (2), the temperature (e.g., about 700 to 800° C.) which is required for the strain elimination annealing is held for a prescribed time (about several tens of minutes). In the cooling step (3), the temperature is lowered to a desired level at a cooling speed of about 20 to 30° C./min.

A film forming step 204 forms a DLC film by applying a DLC coating to a surface of the etched and annealed dust core, which faces the winding wire. The DLC coating can be realized by an appropriate method; for example, a plasma CVD method may be used to form the film by decomposing hydrocarbon-based gas such as methane gas by plasma.

A winding step 205 winds the winding wire on the tooth portions of the stator core produced through the steps 201 to 204.

According to the embodiment described above, the following advantages may be obtained.

(1) In the present embodiment, the dust core which is obtained by press-molding the magnetic powder particles coated with the insulating film is used as the base body, and the inorganic heat-resistant insulating film is formed on at least a part of the surface of the dust core which faces the winding wire. Therefore, while the same effects as those of the core described in the above-described JP-A 2004-242443 can be obtained, high heat resistance can be provided and the motor can be made compact in comparison with the core having the organic insulating film described in JP 2004-242443 A. Because a dust core having a high degree of shape freedom is used as the base body, the surface on which the heat-resistant insulating film is formed can be easily formed to have a shape (e.g., a smooth curved surface not having a corner portion) suitable for coating, and a film forming property can easily be improved.

(2) In the present embodiment, the film forming property of the heat-resistant insulating film can be improved, because the winding surface of the dust core on which the winding wire is wound is formed to have a smooth curved surface. Especially, the film forming property of the DLC film into a three-dimensional shape can be improved.

(3) By using a DLC film for the inorganic heat-resistant insulating film, the heat-resistant insulating film can be made thin, and further downsizing is possible, while at the same time a surface friction coefficient can be decreased, and winding characteristics and resistance to fabrication degradation can be improved.

(4) In this embodiment, the surface layer of the dust core undergone the press-molding in the compacting step is removed by etching, and the heat-resistant insulating film is formed. Therefore, the surface nature (such as surface roughness) of the dust core deteriorated by etching can be recovered by this embodiment. Additionally, the portion having become brittle by etching can be protected and, because the film is formed on the surface layer which has been roughened by etching, adhesiveness between the dust core and the heat-resistant insulating film by an anchor effect can be enhanced.

(5) In this embodiment, heat treatment of the dust core which is coated with the ceramic material is performed to simultaneously calcine the ceramic material and to anneal for strain elimination of the dust core. Therefore, two heat treatment steps of baking and annealing can be integrated into a single process, to streamline the steps and reduce production time and cost.

The present invention is not limited to the embodiment described above but can be modified in various ways without departing from the scope or spirit of the invention.

For example, although in the example illustrating the above embodiment the surface layer of the press-molded dust core was removed by etching, other methods, such as, for example, machining or cutting, may be used to remove the surface layer.

Additionally, although an example was described in the above embodiment wherein the core according to the present invention was applied to a motor, the core according to the present invention can also be applied to other electric and electronic equipment, such as, for example, transformers, reactors, generators, and the like.

The invention claimed is:

1. A method for producing a dust core on which a winding wire is wound, comprising the steps of:
   compacting by charging magnetic powder particles coated with an insulating film into a molding die and press-molding the magnetic powder particles in the molding die;
   etching to remove a surface layer of the press-molded dust core;
   coating an insulating ceramic material on at least a part of the surface of the etched dust core which faces the winding wire; and
   heating to perform a heat treatment of the ceramic material-coated dust core to calcine the ceramic material and to anneal the dust core at the same time.

* * * * *